US011091129B2

(12) United States Patent
Dowling et al.

(10) Patent No.: US 11,091,129 B2
(45) Date of Patent: Aug. 17, 2021

(54) VEHICLE CLEANING SYSTEM AND METHOD

(71) Applicant: FORD GLOBAL TECHNOLOGIES, LLC, Dearborn, MI (US)

(72) Inventors: Andrew Dowling, Chelmsford (GB); Robert Woolley, Reading (GB)

(73) Assignee: Ford Global Technologies, LLC, Dearborn, MI (US)

( * ) Notice: Subject to any disclaimer, the term of this patent is extended or adjusted under 35 U.S.C. 154(b) by 500 days.

(21) Appl. No.: 16/156,252

(22) Filed: Oct. 10, 2018

(65) Prior Publication Data

US 2019/0111897 A1  Apr. 18, 2019

(30) Foreign Application Priority Data

Oct. 12, 2017 (GB) ..................... 1716720

(51) Int. Cl.
*B60S 3/00* (2006.01)
*B60N 2/14* (2006.01)
(Continued)

(52) U.S. Cl.
CPC ............. *B60S 3/008* (2013.01); *A47L 7/02* (2013.01); *A47L 9/2826* (2013.01); *A47L 9/2852* (2013.01); *A47L 11/28* (2013.01); *A47L 11/4011* (2013.01); *B60N 2/0244* (2013.01); *B60N 2/14* (2013.01); *B60S 1/64* (2013.01); *G05D 1/0219* (2013.01);
(Continued)

(58) Field of Classification Search
CPC ......... B60S 3/008; B60S 1/64; G05D 1/0282; G05D 1/0246; G05D 1/0219; G05D 1/0231; G05D 2201/0203; G05D 2201/0215; B60N 2/14; B60N 2/0244; B60N 2/02; A47L 11/4011; A47L 11/4061; A47L 7/02; A47L 9/2826; A47L 9/2852; A47L 11/28; A47L 2201/02; A47L 2201/04; A47L 11/24; A47L 11/4091
See application file for complete search history.

(56) References Cited

U.S. PATENT DOCUMENTS 5,504,969 A * 4/1996 Beryozkin ............... B60S 3/008
                                                          15/21.1
7,231,686 B1 * 6/2007 Matheney .............. A47L 7/0076
                                                          15/313
(Continued)

FOREIGN PATENT DOCUMENTS

CN    103612620 A    3/2014
CN    205597847 U    9/2016
(Continued)

OTHER PUBLICATIONS

GB App. No. 1716720.6 Combined Search and Examination Report dated Feb. 16, 2018.

*Primary Examiner* — Bhavesh V Amin
(74) *Attorney, Agent, or Firm* — Gregory P. Brown; Brooks Kushman P.C.

(57) ABSTRACT

A vehicle cleaning system includes a vehicle having a substantially flat cabin floor from which a plurality of seats of the vehicle extend, and a robotic cleaning device. The robotic cleaning device includes wheels configured to propel the cleaning device along the cabin floor and selectively clean the cabin floor.

19 Claims, 5 Drawing Sheets

(51) Int. Cl.
*A47L 11/40* (2006.01)
*G05D 1/02* (2020.01)
*B60N 2/02* (2006.01)
*B60S 1/64* (2006.01)
*A47L 7/02* (2006.01)
*A47L 9/28* (2006.01)
*A47L 11/28* (2006.01)

(52) U.S. Cl.
CPC ......... *G05D 1/0231* (2013.01); *G05D 1/0246* (2013.01); *A47L 2201/02* (2013.01); *A47L 2201/04* (2013.01); *B60N 2/02* (2013.01); *G05D 2201/0203* (2013.01); *G05D 2201/0215* (2013.01)

(56) References Cited

U.S. PATENT DOCUMENTS

| | | | | |
|---|---|---|---|---|
| 8,663,782 | B1* | 3/2014 | Siegel | A61G 13/102 428/167 |
| 8,839,812 | B2* | 9/2014 | Tanhehco | A61G 10/00 137/312 |
| 9,855,926 | B2* | 1/2018 | Stauffer | B60N 3/048 |
| 10,040,432 | B2* | 8/2018 | Stauffer | G05D 1/0088 |
| 10,872,253 | B2* | 12/2020 | Qiu | G06K 9/00771 |
| 2009/0019662 | A1* | 1/2009 | Yona | B60S 1/64 15/313 |
| 2010/0043168 | A1* | 2/2010 | Johnson | B60S 1/64 15/313 |
| 2017/0210352 | A1* | 7/2017 | Stauffer | B60N 3/08 |
| 2017/0210353 | A1* | 7/2017 | Stauffer | G01C 21/3438 |

FOREIGN PATENT DOCUMENTS

| | | |
|---|---|---|
| CN | 206484560 U | 9/2017 |
| DE | 1703830 A1 | 3/1972 |
| DE | 10021905 A1 | 11/2001 |
| DE | 102011010205 A1 | 10/2011 |
| DE | 102016009585 A1 | 2/2017 |
| DE | 102017101508 A1 | 7/2017 |
| EP | 3424229 A1 | 4/1991 |
| EP | 0562559 A1 | 9/1993 |
| EP | 0569984 A1 | 11/1993 |
| GR | 20110100064 A | 9/2012 |
| JP | H05324060 A | 12/1993 |
| JP | H05324062 A | 12/1993 |
| KR | 20140119579 A | 10/2014 |
| WO | 2006088434 A1 | 8/2006 |

* cited by examiner

VEHICLE CLEANING SYSTEM AND METHOD

CROSS-REFERENCE TO RELATED APPLICATIONS

This application claims foreign priority benefits under 35 U.S.C. § 119(a)-(d) to GB Application 1 716 720.6 filed Oct. 12, 2017, which is hereby incorporated by reference in its entirety.

TECHNICAL FIELD

This disclosure relates generally to a vehicle cleaning system for a vehicle, the vehicle cleaning system comprising a robotic cleaning device configured to clean a floor of the vehicle.

BACKGROUND

Different vehicle seating arrangements will become possible with the advent of fully autonomous vehicles. For example, the driver's seat may rotate to face other vehicle occupants. In such an example, the floor of the cabin will become more visible and its cleanliness will be more apparent.

SUMMARY

According to an aspect of the present disclosure there is provided a vehicle cleaning system comprising:

a vehicle, such as a motor vehicle, having a substantially flat cabin floor from which a plurality of seats of the vehicle extend, wherein the seats are movable relative to the cabin floor;

a robotic cleaning device comprising wheels configured to propel the cleaning device along the cabin floor and selectively clean the cabin floor; and a controller configured to control the robotic cleaning device and controls movement of the seats relative to the cabin floor, wherein the controller is configured to coordinate movement of the seats and robotic cleaning device so as to move one or more of the seats to make an area of the cabin floor accessible to the robotic cleaning device and then move the robotic cleaning device so as to traverse said area. Said area made accessible by moving the one or more seats may not have been previously fully accessible to the robotic cleaning device.

The seats may comprise a support structure (such as a column, stanchion, frame or other structure) that supports a seat base of the seat. The support structure may move relative to the cabin floor.

The controller may reside in the robotic cleaning device and/or in vehicle. The controller may control a path of the robotic cleaning device across the cabin floor.

The controller may be configured to predict times when the vehicle is unlikely to be deployed. The controller may deploy the robotic cleaning device at such times. The controller may collect usage data for the vehicle and determine patterns of vehicle usage. Cleaning by the robotic cleaning device may be scheduled outside predicted periods of vehicle usage determined from such patterns.

The controller may refer to a driver's electronic calendar to determine future vehicle usage. Cleaning by the robotic cleaning device may be scheduled prior to such future vehicle usage. The controller may determine if the driver will have guests in the vehicle, e.g. by reference to the driver's electronic calendar. Cleaning (e.g. deeper cleaning than otherwise) by the robotic cleaning device may be scheduled prior to the arrival of the guests.

The vehicle may comprise at least one sensor configured to identify dirty areas on the cabin floor. The sensor may comprise a camera that may be configured to capture images of the cabin floor. The controller may instruct the robotic cleaning device to traverse dirty areas of the cabin floor detected by the sensor. The sensor may provide feedback to the controller to verify that a particular dirty area has been satisfactorily cleaned. If a particular area has not been satisfactorily cleaned, e.g. as determined by the sensor and controller, the controller may request further cleaning.

The vehicle may comprise a cavity for receiving the robotic cleaning device. The cavity may be adjacent to the cabin floor. The vehicle may comprise a selectively openable door between the cavity and the cabin floor. The door may be flush with a surrounding trim when the trap door is in a closed position. The controller may control the position of the trap door, e.g. via an actuator operatively coupled to the controller. The controller may open the trap door when the robotic cleaning device is to be deployed. The cavity may be accessible from outside the vehicle, e.g. via a selectively openable hatch.

The robotic cleaning device may comprise a vacuum cleaner, a sweeping device, a shampooing device and/or any other cleaning device.

The vehicle cleaning system may further comprise a dirt receptacle configured to receive dirt collected by the robotic cleaning device. The dirt receptacle may be external to the robotic cleaning device. For example, the dirt receptacle may be in or adjacent to the cavity. The robotic cleaning device may be configured to selectively transfer dirt from the robotic cleaning device to the dirt receptacle. The dirt receptacle may be accessible from outside the vehicle, e.g. via a selectively openable hatch.

The vehicle cleaning system may further comprise a fluid receptacle configured to receive used or fresh fluid (e.g. shampoo, polish or any other fluid) for cleaning the cabin floor. The fluid receptacle may be external to the robotic cleaning device. For example, the fluid receptacle may be in or adjacent to the cavity. The robotic cleaning device may be configured to selectively transfer used fluid from the robotic cleaning device to the fluid receptacle and/or fresh fluid from the or another fluid receptacle to the robotic cleaning device. The fluid or another fluid receptacle may be accessible from outside the vehicle, e.g. via a selectively openable hatch.

According to another aspect of the present disclosure there is provided a method of cleaning a vehicle having a substantially flat cabin floor from which a plurality of seats of the vehicle extend, wherein the seats are movable relative to the cabin floor, the method comprising:

selectively cleaning the cabin floor with a robotic cleaning device comprising wheels configured to propel the cleaning device along the cabin floor; and controlling movement of the seats and robotic cleaning device so as to move one or more of the seats to make an area of the cabin floor accessible to the robotic cleaning device and then moving the robotic cleaning device so as to traverse said area.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
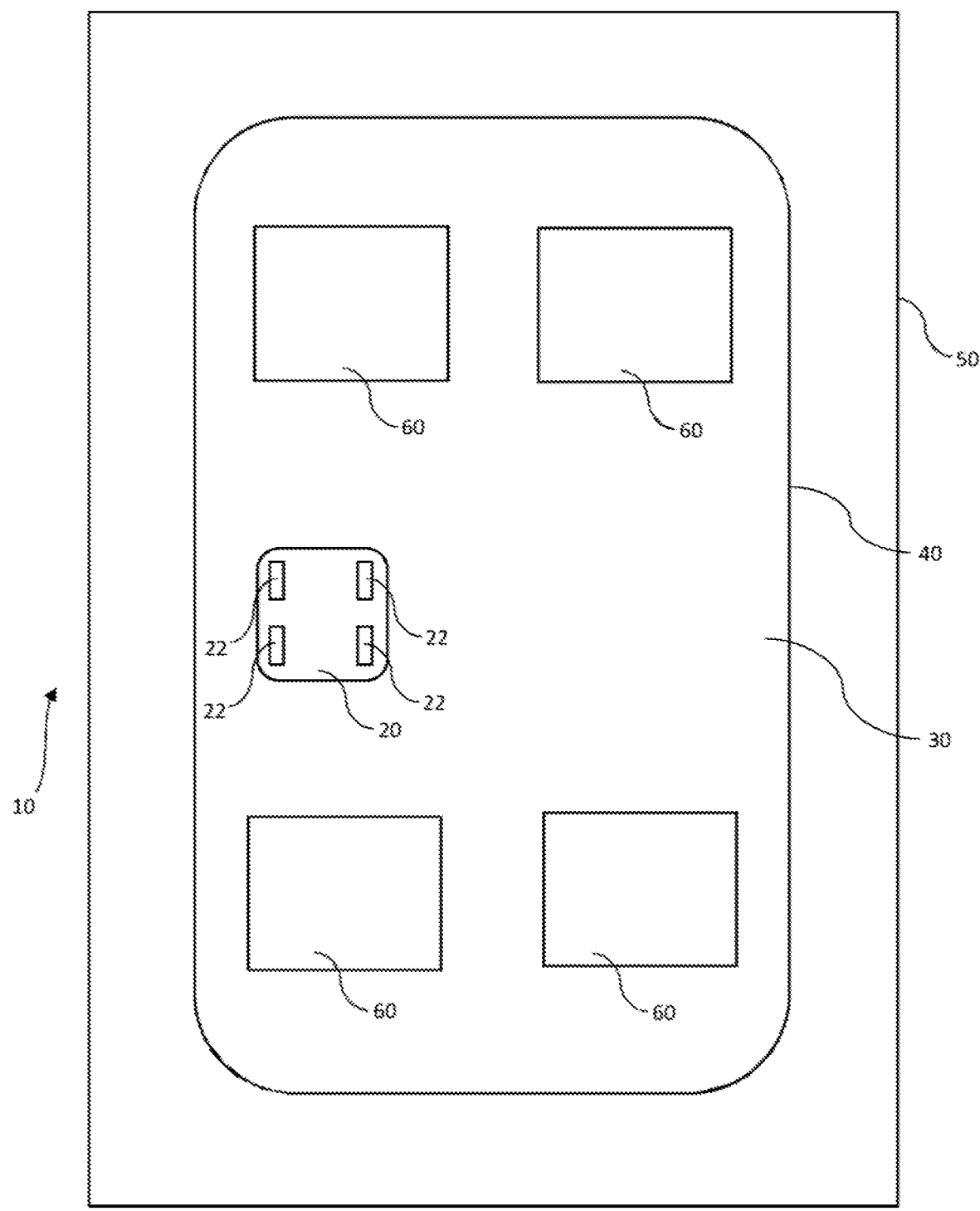
FIG. 1 is a schematic plan view of a vehicle cleaning system according to an arrangement of the present disclosure.

With reference to FIG. 1, the present disclosure relates to a vehicle cleaning system 10 comprising a robotic cleaning device 20 configured to clean a floor 30 within a cabin 40 of a vehicle 50. The robotic cleaning device 20 may traverse the vehicle cabin floor 30 so as to clean the cabin floor. The vehicle 50 may be a motor vehicle, such as a car, coach etc., or any other type of vehicle, such as an airplane, train etc.

A plurality of seats 60 may extend from the floor 30. The cabin floor 30 may be substantially flat. Each of the seats 60 may extend from the flat floor 30, which may continue to be flat in areas between the seats 60. In other words, each of the seats 60 may extend from the same flat floor.

The robotic cleaning device 20 may comprise one or more wheels 22, which may be configured to propel the robotic cleaning device along the cabin floor 30. For example, one or more of the wheels may be driven by a motor to provide the motive force to propel the robotic cleaning device 20. The direction of travel of the robotic cleaning device 20 may be changed by the same wheel or one or more of the wheels 22.

The robotic cleaning device 20 may comprise a vacuum cleaner, a sweeping device, a shampooing device and/or any other cleaning device. The cabin floor 30 may comprise a carpet, e.g. with upstanding fibers, or a substantially smooth surface, such as a vinyl flooring.

With reference to FIG. 2, the vehicle cleaning system 10 may further comprise a controller 70. The controller 70 may at least partially control the robotic cleaning device 20. In particular, the controller 70 may control movement of the robotic cleaning device 20 and may determine the path that the robotic cleaning device 20 follows. The controller 70 may be provided on board the robotic cleaning device 20 or within the vehicle 50. Alternatively, the controller 70 may be provided in the vehicle 50 and on board the robotic cleaning device 20, e.g. with respective modules of the controller on board the robotic cleaning device 20 and in the vehicle 50. In the event that the controller 70 or a portion thereof is not provided on board the robotic cleaning device 20, the controller 70 or portion thereof may wirelessly communicate with the robotic cleaning device 20.

Figure 2A:
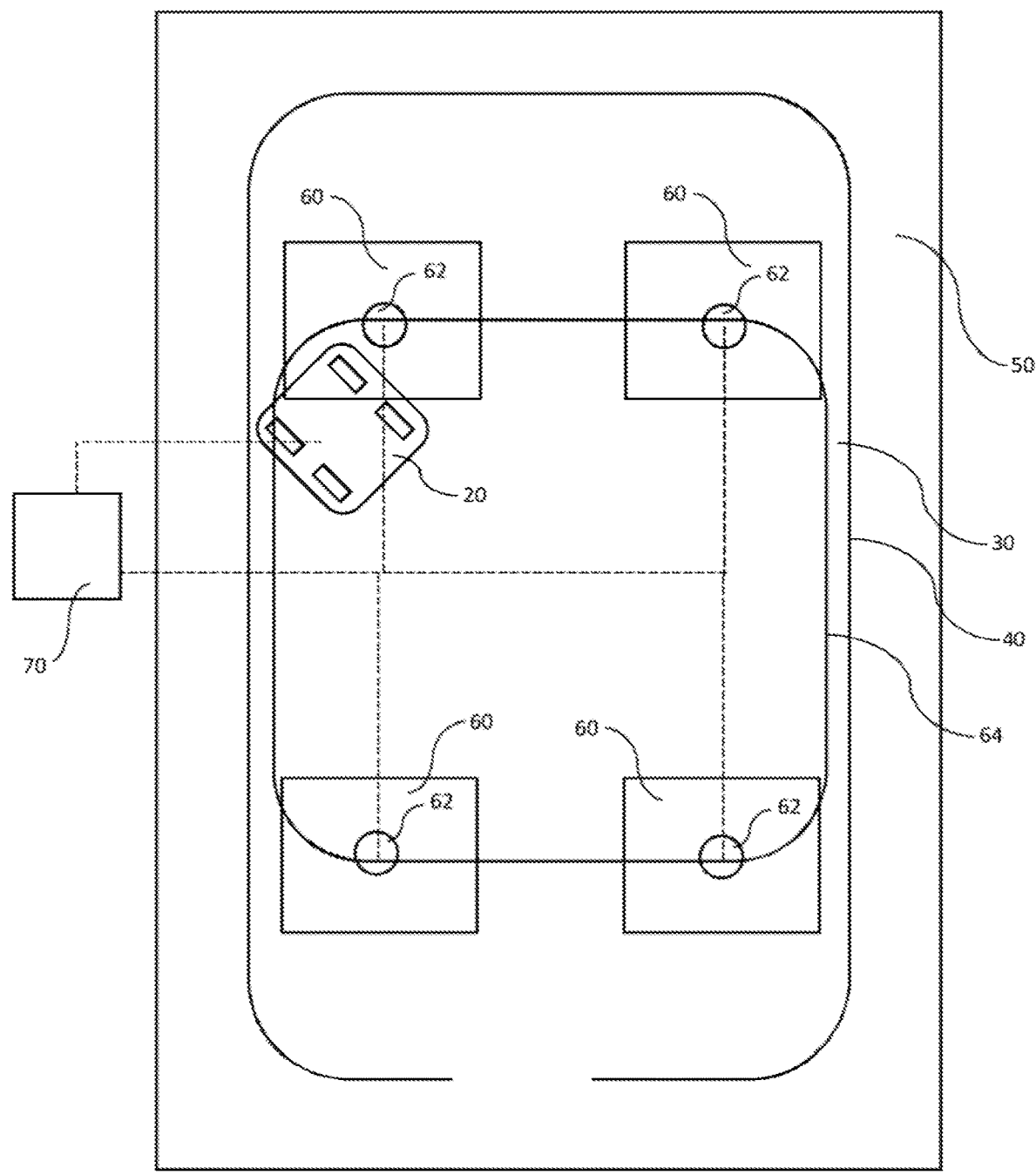
FIGS. 2A and 2B are schematic plan views of a vehicle cleaning system according to an arrangement of the present disclosure.
Figure 2B:
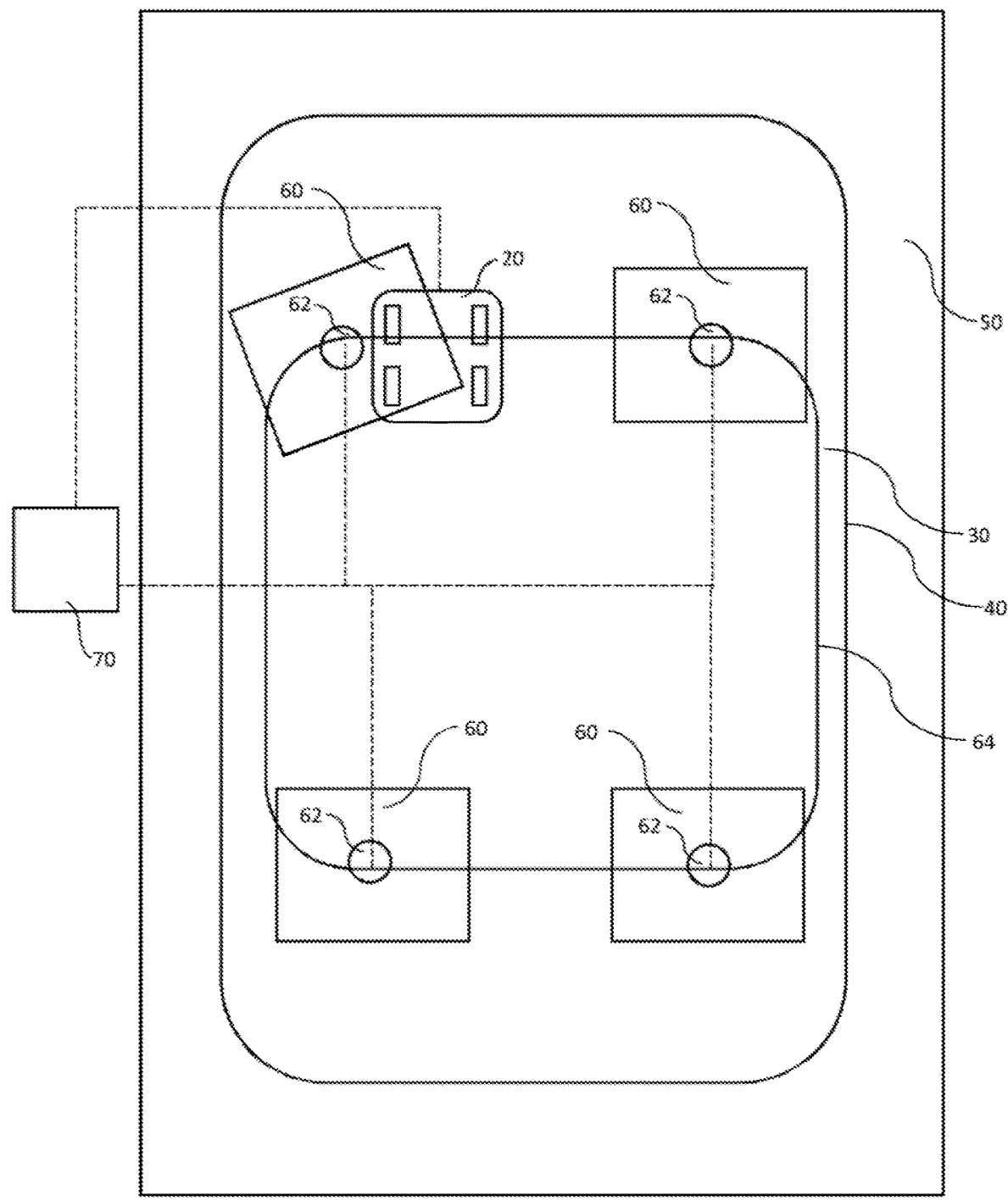

One or more of the seats 60 may be movable relative to the cabin floor 30. The seats 60 may comprise a support structure 62, such as a column, stanchion, frame or other structure, that extends from the cabin floor 30 and supports a seat base of the seat 60. The, or at least a portion of, the support structure 62 may move relative to the cabin floor 30 such that the remainder of the seat 60 also moves relative to the cabin floor. The support structure 62 may be guided by a track 64 provided in the cabin floor 30. Each of the movable seats 60 may have its own track, or as depicted in FIGS. 2A and 2B, each of the movable seats may be guided by a common track 64 that extends around the cabin floor 30. The track 64 may enclose a central region of the cabin floor 30, however, the track 64 may be discontinuous so that it only partially encloses a region of the floor 30.

The controller 70 or another controller may control movement of the movable seats 60 relative to the floor 30. For example, occupants of the vehicle may request a different seating configuration and the controller 70 may instruct actuators (not shown) to move the relevant seats 60 into the desired configuration.

In the event that the controller 70 (or combination of controllers) controls both the robotic cleaning device 20 and the position of one or more of the seats 60, the controller 70 (or modules thereof) may co-ordinate the movement of the seat 60 and robotic cleaning device 20 to maximize the cleaning effect in the vicinity of the particular seat. For example, as depicted in FIG. 2A, one of the seats 60 may be in a first position and the robotic cleaning device 20 may clean around the support structure 62 of that particular seat. The controller 70 may then instruct the particular seat 60 to move to a second position as depicted in FIG. 2B and the robotic cleaning device 20 may then clean where the support structure 62 had previously been in the first position. Such co-ordination of the robotic cleaning device 20 and seat 60 and their respective movements may help to maximize cleaning in the area surrounding a particular seat 60. This may be particularly beneficial as the robotic cleaning device 20 may not be able to effectively clean right up to an edge of the robotic cleaning device 20. By moving the seat 60, the robotic cleaning device 20 may gain better access to the areas around the seat. The above described process may be repeated at each of the seats 60 that is movable.

The controller 70 may be further configured to predict times when the vehicle 50 is unlikely to be driven. The controller 70 may then deploy the robotic cleaning device 20 at such times. For example, the controller 70 may determine that the vehicle 50 is unlikely to be deployed at night or during work hours. The controller may also predict locations when the vehicle is unlikely to be deployed. For example, if the vehicle is parked at home, e.g. during the night, or at work, e.g. during work hours. The controller 70 may collect usage data for the vehicle 50 and determine patterns of vehicle usage so that periods of non-usage can be inferred. The controller 70 may schedule cleaning by the robotic cleaning device 20 during such predicted periods of vehicle non-usage.

The controller 70 may refer to a driver's electronic calendar to determine future vehicle usage. For example, the controller 70 may infer from the driver's electronic calendar that the driver is scheduled to go on a trip and cleaning by the robotic cleaning device 20 may be scheduled prior to such a trip. The controller 70 may also determine if the driver is likely to have guests in the vehicle, e.g. by referring to the driver's electronic calendar. Cleaning by the robotic cleaning device 20 may be scheduled prior to the arrival of the guests and the controller may request a deeper clean than if there had not been guests.

Figure 3:
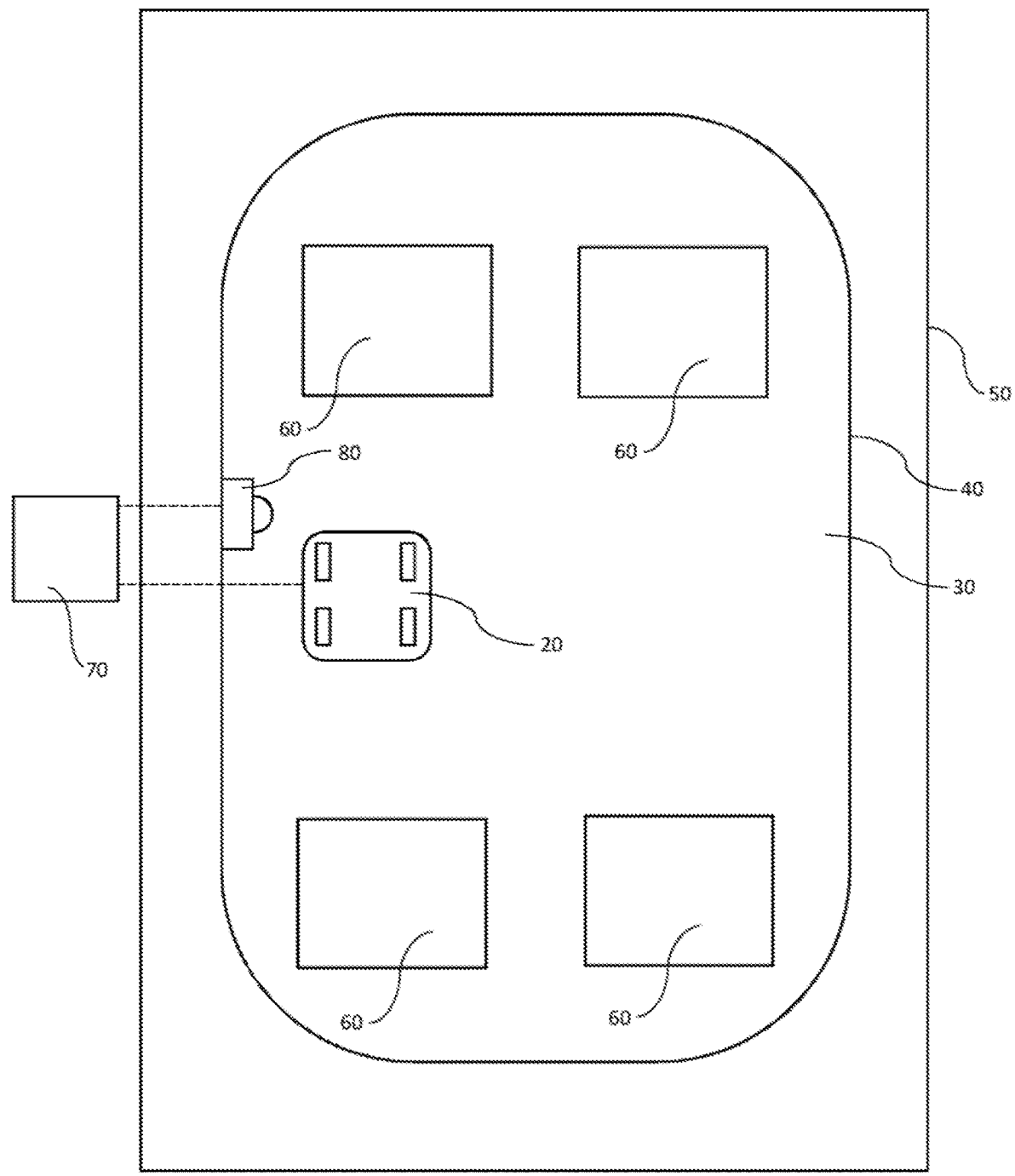
FIG. 3 is a schematic plan view of a vehicle cleaning system according to an arrangement of the present disclosure.

With reference to FIG. 3, the vehicle cleaning system 10 may comprise a sensor 80, which may be configured to identify dirty areas on the vehicle cabin floor 30. The sensor 80 may comprise a camera that may be configured to capture images of the cabin floor 30. The sensor 80 may be operatively coupled to the controller 70. The controller 70 may instruct the robotic cleaning device 20 to traverse dirty areas of the cabin floor 30 detected by the sensor 80. For example, the controller 70 may instruct the robotic cleaning device 20 to focus on such dirty areas. The sensor 80 may provide feedback to the controller 70 to verify that a particular dirty area has been satisfactorily cleaned. If a particular area has not been satisfactorily cleaned, the controller 70 may request further cleaning by the robotic cleaning device 20.

Figure 4:
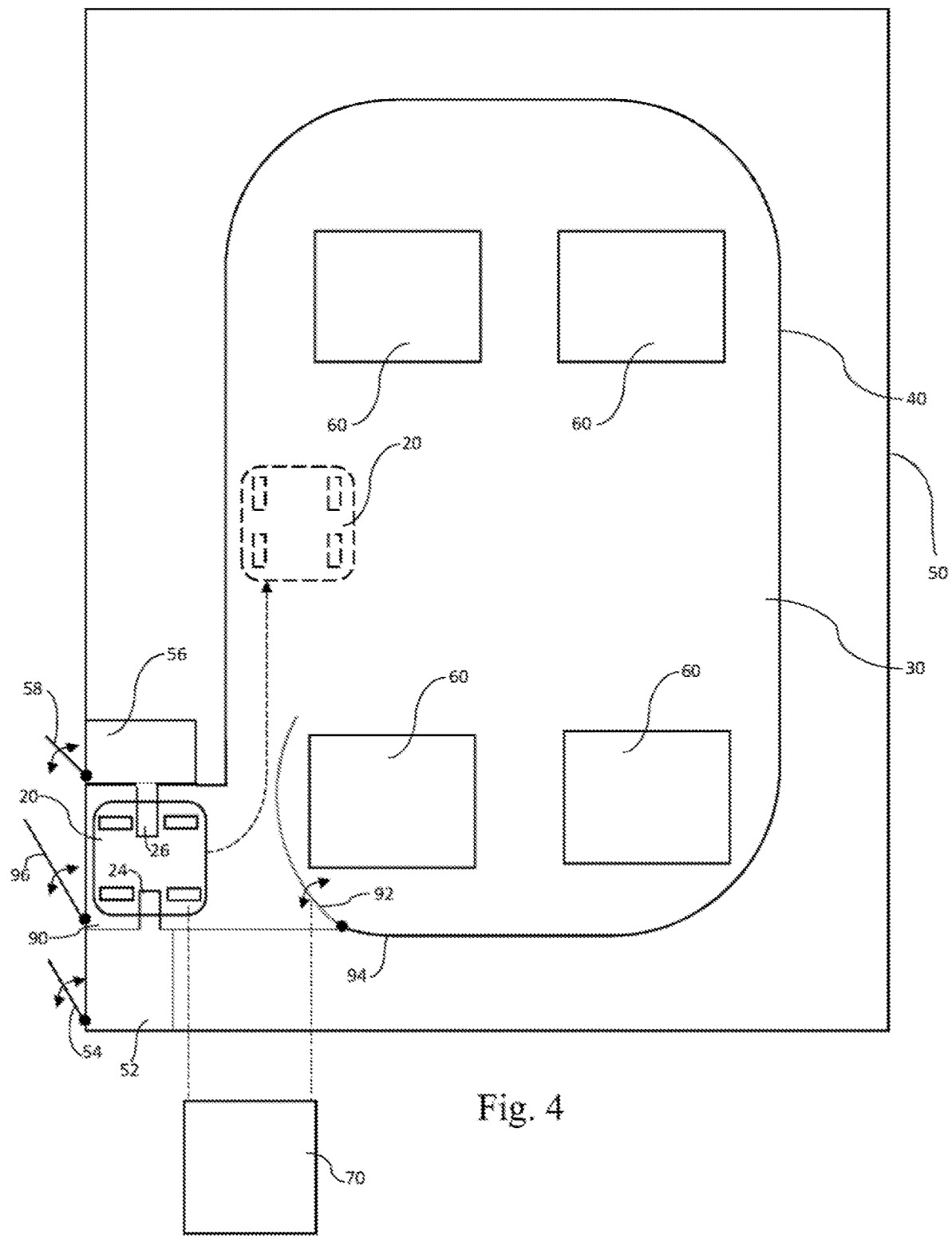
FIG. 4 is a schematic plan view of a vehicle cleaning system according to an arrangement of the present disclosure.

With reference to FIG. 4, the vehicle 50 may further comprise a cavity 90 for receiving the robotic cleaning device 20. The cavity 90 may be adjacent to the cabin floor 30. In addition, the cavity 90 may be on the same level as the cabin floor 30 such that a floor of the cavity is at the same level as the cabin floor 30. The robotic cleaning device 20 can readily move from the cavity 90 to the cabin floor 30 without having to travel over any step changes in the floor level. The vehicle 50 may further comprise a selectively openable door 92 between the cavity 90 and the cabin floor 30. The door 92 may be flush with a surrounding trim 94 when the door 92 is in a closed position. The controller 70 may control the position of the door 92, e.g. via an actuator operatively coupled to the controller 70. The controller 70 may open the trap door 92 when the robotic cleaning device 20 is to be deployed. The door 92 may be closed when the robotic cleaning device 20 is performing a cleaning operation. The door 92 may reopen when the robotic cleaning device is returned to the cavity 90. The door 92 may then close behind the robotic cleaning device 20 so that the robotic cleaning device is out of view when not in use.

The vehicle 50 may also comprise a hatch 96 on the outside of the vehicle, which may provide access to the cavity 90. The hatch 96 may be opened to gain access to the robotic cleaning device 20 when it is stowed in the cavity 90. The controller 70 may prevent opening of the hatch 96 if the door 92 is in an open position. If the robotic cleaning device 20 is midway through a clean, the controller 70 may instruct the robotic cleaning device 20 to return to the cavity 90 before allowing the hatch 96 to be opened. Opening of the hatch 96 may allow the robotic cleaning device 20 to be maintained. For example, an internal dirt receptacle 24 within the robotic cleaning device 20 may be emptied. Additionally or otherwise, a liquid containing receptacle 26 within the robotic cleaning device 20 may also be emptied and/or filled. In this way, the owner of the vehicle 50 or a third party may maintain the functionality of the robotic cleaning device 20. The robotic cleaning device may be removed, e.g. if it requires repair, and a replacement robotic cleaning device 20 may be placed in the cavity 90.

The vehicle 50 may optionally comprise a vehicle dirt receptacle 52 configured to receive dirt collected by the robotic cleaning device 20. For example, the vehicle dirt receptacle 52 may receive dirt from the dirt receptacle 24 on board the robotic cleaning device 20. The vehicle dirt receptacle 52 may be in or adjacent to the cavity 90. The robotic cleaning device 20 and/or vehicle 50 may be configured to selectively transfer dirt from the robotic cleaning device to the vehicle dirt receptacle 52. For example, the robotic cleaning device 20 and/or vehicle 50 may comprise a pump (not shown) configured to transfer dirt from the dirt receptacle 24 on board the robotic cleaning device 20 to the vehicle dirt receptacle 52. The vehicle dirt receptacle 52 may be accessible from outside the vehicle 50, e.g. via a selectively openable hatch 54. The hatch 54 may allow the vehicle owner or a third party to gain access to the vehicle dirt receptacle 52 so that the dirt can be removed.

The vehicle 50 may additionally or otherwise comprise a vehicle fluid receptacle 56 configured to receive used or fresh fluid for cleaning the cabin floor 30. The fluid may comprise shampoo, polish or any other fluid for use in cleaning the cabin floor 30. The vehicle fluid receptacle 56 may be in or adjacent to the cavity 90. The robotic cleaning device 20 and/or vehicle 50 may be configured to selectively transfer fluid between the vehicle fluid receptacle 56 and the fluid receptacle 26 on board the robotic cleaning device 20, e.g. by virtue of a pump. The vehicle fluid receptacle 56 may be accessible from outside the vehicle 50, e.g. via a selectively openable hatch 58. The hatch 58 may allow the owner of the vehicle or a third party to access the vehicle fluid receptacle 56 so that the fluid in the receptacle may be replaced or replenished.

The robotic cleaning device 20 may comprise a battery configured to power a motor that drives one or more of the wheels 22. The battery may be recharged when the robotic cleaning device 20 is stowed in the cavity 90. The robotic cleaning device 20 may dock with a charging interface, which may be in the form of a mechanical connection or a wireless connection, e.g. using inductive charging.

The robotic cleaning device 20 may also comprise one or more sensors configured to detect obstacles in its path. The robotic cleaning device 20 may adjust its path to avoid such obstacles. The controller 70 (or another controller or module) may control the path of the robotic cleaning device 20. For example, the controller 70 may have knowledge of the locations of the seats 60 and the perimeter of the vehicle cabin floor 30. The controller 70 may prescribe a path for the robotic cleaning device 20 to traverse. The robotic cleaning device may detect obstacles in its path and may send data relating to the obstacles to the controller 70. The controller 70 may adjust the path of the robotic cleaning device 20 to account for the sensed obstacles. The vehicle sensor 80 may also assist in detecting obstacles within the vehicle cabin 40. The sensor 80 may send data to the controller 70 and the controller 70 may adjust the path of the robotic cleaning device 20 to account for such obstacles.

It will be appreciated by those skilled in the art that although the invention has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle cleaning system comprising:
a vehicle having a substantially flat cabin floor from which a plurality of seats of the vehicle extend, wherein the seats are movable relative to the cabin floor;
a robotic cleaning device comprising wheels configured to propel the cleaning device along the cabin floor and selectively clean the cabin floor; and
a controller configured to control the robotic cleaning device and controls movement of the seats relative to the cabin floor,
wherein the controller is configured to coordinate movement of the seats and robotic cleaning device so as to move one or more of the seats to make an area of the cabin floor accessible to the robotic cleaning device and then move the robotic cleaning device so as to traverse said area.

2. The vehicle cleaning system of claim 1, wherein the seats comprise a support structure that supports a seat base of the seat and the support structure moves relative to the cabin floor.

3. The vehicle cleaning system of claim 1, wherein the controller controls a path of the robotic cleaning device across the cabin floor.

4. The vehicle cleaning system of claim 1, wherein the controller is configured to predict times when the vehicle is unlikely to be deployed and the controller deploys the robotic cleaning device at such times.

5. The vehicle cleaning system of claim 4, wherein the controller collects usage data for the vehicle and determines patterns of vehicle usage.

6. The vehicle cleaning system of claim 4, wherein the controller refers to a driver's electronic calendar to determine future vehicle usage.

7. The vehicle cleaning system of claim 1, wherein the vehicle comprises at least one sensor configured to identify dirty areas on the cabin floor.

8. The vehicle cleaning system of claim 7, wherein the sensor comprises a camera that is configured to capture images of the cabin floor.

9. The vehicle cleaning system of claim 7, wherein the controller instructs the robotic cleaning device to traverse dirty areas of the cabin floor detected by the sensor.

10. The vehicle cleaning system of claim 7, wherein the sensor provides feedback to the controller to verify that a particular dirty area has been satisfactorily cleaned.

11. The vehicle cleaning system of claim 1, wherein the vehicle comprises a cavity for receiving the robotic cleaning device, the cavity being adjacent to the cabin floor.

12. The vehicle cleaning system of claim 11, wherein the vehicle comprises a selectively openable door between the cavity and the cabin floor.

13. The vehicle cleaning system of claim 12, wherein the door is flush with a surrounding trim when the door is in a closed position.

14. The vehicle cleaning system of claim 12, wherein the controller controls the position of the door and the controller opens the door when the robotic cleaning device is to be deployed.

15. The vehicle cleaning system of claim 11, wherein the cavity is accessible from outside the vehicle via a selectively openable hatch.

16. The vehicle cleaning system of claim 1, wherein the robotic cleaning device comprises a vacuum cleaner, a sweeping device and/or a shampooing device.

17. The vehicle cleaning system of claim 1, wherein the vehicle cleaning system further comprises a dirt receptacle configured to receive dirt collected by the robotic cleaning device.

18. The vehicle cleaning system of claim 17, wherein the dirt receptacle is accessible from outside the vehicle via a selectively openable hatch.

19. A method comprising:
cleaning a cabin floor of a vehicle from which seats extend with a robotic cleaning device having wheels propelling the cleaning device along the cabin floor; and
controlling movement of the seats and robotic cleaning device to move one or more of the seats to make an area of the cabin floor accessible to the robotic cleaning device and moving the robotic cleaning device so as to traverse the area.

* * * * *